(12) United States Patent
Jacob

(10) Patent No.: US 6,324,993 B1
(45) Date of Patent: Dec. 4, 2001

(54) HYDRAULIC LOAD-SHIFTING DEVICE FOR DRAWBAR

(76) Inventor: Charles R. Jacob, P.O. Box 611, American Fork, UT (US) 84003

( * ) Notice: Subject to any disclaimer, the term of this patent is extended or adjusted under 35 U.S.C. 154(b) by 0 days.

(21) Appl. No.: 09/261,674

(22) Filed: Mar. 3, 1999

(51) Int. Cl.$^7$ ..................................................... B61C 11/00
(52) U.S. Cl. ........................................... 105/72.2; 105/75
(58) Field of Search .............................. 105/72.2, 75, 82; 213/75 R

(56) References Cited

U.S. PATENT DOCUMENTS

| | | |
|---|---|---|
| 2,864,627 | 12/1958 | Kleinknecht . |
| 2,997,121 | 8/1961 | Clifton, Sr. et al. . |
| 3,940,167 | 2/1976 | Pilz . |
| 4,067,259 * | 1/1978 | Ames et al. ........................ 105/72.2 |
| 4,497,257 | 2/1985 | White, Jr. . |
| 4,537,137 | 8/1985 | White, Jr. . |
| 4,878,436 | 11/1989 | Lich et al. . |
| 5,301,615 | 4/1994 | Evans et al. . |
| 5,740,742 * | 4/1998 | Bush .................................. 105/72.2 |
| 5,749,593 | 5/1998 | Phillips et al. . |
| 5,868,078 * | 2/1999 | Madison ............................. 105/72.2 |

* cited by examiner

Primary Examiner—S. Joseph Morano
Assistant Examiner—Robert J. McCarry, Jr.
(74) Attorney, Agent, or Firm—Thorpe North & Western

(57) ABSTRACT

A railcar moving vehicle having a load-shifting device for shifting a portion of the weight of a railcar to the railcar moving vehicle. The railcar moving vehicle has a frame, an engine, and at least one pair of drive wheels disposed toward the rearward portion of the frame and configured to ride on railroad track. The load-shifting device is connected to the vehicle frame rearward of the drive wheels, and includes a rearward facing coupler which is configured to transmit vertical and horizontal forces to a coupled railcar. The coupler is moveable by means of the load shifting device between a first lowered position for coupling with a standard railcar coupler, and a second position above and forward of the first position, thereby imposing a portion of the weight of the railcar upon the frame of the railcar moving vehicle, and moving the bearing point of the weight closer to above the drive wheels. In the preferred embodiment, the lifting means is hydraulically powered and moves the coupler from the first position to the second position in a substantially linear, diagonally upward motion at an angle of approximately 45°. The railcar moving vehicle is preferably a modified semi tractor having a standard fifth wheel connector for connection to a standard highway trailer, and is provided with means for selectively installing rubber tired wheels to allow operation of the vehicle as a trailer moving vehicle on roadways.

14 Claims, 3 Drawing Sheets

HYDRAULIC LOAD-SHIFTING DEVICE FOR DRAWBAR

BACKGROUND OF THE INVENTION

1. Field of the Invention

This invention relates to railcar moving vehicles which are adaptable both for moving railcars along railroad track and for use on roadways. More particularly, the present invention relates to a vehicle which functions both as a railcar moving vehicle on rails and as a rubber tired highway trailer moving vehicle, and which incorporates an improved hydraulic load-shifting device for vertically and horizontally moving a coupled railcar to transfer a portion of the railcar load to the drive wheels of the railcar moving vehicle in order to improve traction.

2. State of the Art

In the railroad industry, maintenance of way is a critical activity and a major expense. Frequently, when maintenance is needed at a particular location along the right-of-way and heavy equipment or materials are required, a work train and crew are sent to that location to perform the needed repairs. For example, a work train may carry a load of railroad ties and short sections of rail for repairing track, and may include some pieces of heavy equipment for unloading and installing these items. Often, a work train consists of a locomotive pulling a single work car, and the maintenance work can be performed by one or two workers.

However, this approach can be very cost inefficient. Because maintenance of way crews and locomotive crews are differently trained and unable to perform each other's duties, the work train will frequently employ a crew much larger than actually needed at any given time. Obviously, this is costly. Furthermore, the use of a typical locomotive—which may cost in excess of a million dollars—to transport a single car and a few workers is extremely cost inefficient. For these reasons, it would be desirable to have a railcar moving vehicle that can pull one or a few railcars along the railroad track at mainline speeds, but that is not a conventional locomotive, and thus is not as costly as a locomotive, nor requires a full locomotive crew. With such a vehicle a work crew could transport themselves to the work site with their materials and equipment, and perform the work with far less expense for labor and equipment.

Additionally, it would be desirable to have such a railcar moving vehicle that is operable both on rails and on roadways. Such a vehicle would be valuable for maintenance of way crews by allowing a work crew to transport themselves and their equipment by highway to a rail siding where the crew simply transfers their materials and equipment to a waiting railcar, and uses the semi tractor on the rails to pull the work railcar to the work site.

This sort of vehicle would have additional uses, as well. For example, many railroad customers have a need to move railcars and highway trailers around a rail yard or industrial site. However, except for the largest industries, the cost to purchase and maintain a conventional switching locomotive is prohibitive or economically unwarranted. Thus, lightweight, multipurpose railcar moving vehicles have been developed and used to perform many functions normally assigned to switching locomotives, but which may also be used off the track. Such modified or hybrid vehicles are more economical for many industries because of their relatively low cost and high versatility. They allow smaller industries to take advantage of the efficiency and economy of rail transport for heavy freight where otherwise they would not be able to do so.

However, conventional lightweight railcar moving vehicles are still relatively highly specialized, limited production vehicles. The cost per horsepower of these vehicles is significantly higher than the cost of a conventional semi tractor, for example, which enjoys the cost advantages of much greater mass production. Additionally, conventional railcar moving vehicles are not designed or configured to operate on public highways as long or short haul trucks but are confined to an industrial site or switching yard. Many of them do not have the functional and safety equipment required to be street legal, and are designed for low speed operation only, being unable to travel at speeds beyond 15 to 20 miles per hour. Moreover, they cannot operate at top speed for extended periods of time without overheating their hydraulic systems. It would thus be desirable to have a railcar moving vehicle which is constructed from a mass produced vehicle, such as a semi tractor, so as to reduce the acquisition cost of these vehicles. It would also be desirable to have a railcar moving vehicle which is capable of extended operation at high speeds and can be conveniently and legally used for either long or short haul transport of freight on public highways.

Because a loaded railcar may be much heavier than one of these lightweight traction vehicles, various methods have been developed to transfer a portion of the weight of the railcar to the traction vehicle. These methods typically involve some sort of hydraulic system which applies a vertical force to the drawbar of an attached railcar, so as to transfer a portion of the weight of the railcar to the traction vehicle. This transfer helps provide traction to the railcar moving vehicle to allow it to move the railcar without slippage of the drive wheels on the track. However, the devices now known typically involve a coupler extending from one end of the vehicle which lifts the load outboard of the drive and support axles of the vehicle. The load-shifting mechanism does not provide any horizontal movement so as to move the bearing point of the load more directly over the wheels of the traction vehicle. Those knowledgeable in mechanical design will understand that placing the load closer to the nearest supporting axle or between a pair of supporting axles will distribute the load more evenly, and in the case of multiple drive axles, will thereby provide more traction. Additionally, placing the load closer to the nearest supporting axle or between the axles will reduce the moment which tends to lift the end of the vehicle opposite the load. It would thus be desirable to have a railcar moving vehicle which both lifts and forwardly advances a coupled railcar so as to transfer a portion of the load of the railcar to the vehicle and to move the point of bearing of the load closer to the nearest supporting axle, or between supporting axles.

OBJECTS AND SUMMARY OF THE INVENTION

It is therefore an object of the present invention to provide a railcar moving vehicle which lifts the drawbar of a coupled railcar so as to transfer a portion of the weight of the car to the drive wheels of the railcar moving vehicle, and also moves the railcar forward so as to move the bearing point of said weight closer to a point directly above the drive wheels.

It is another object of this invention to provide a railcar moving vehicle that may be used off of railroad tracks for moving trailers on public roadways, and is capable of extended operation at highway speeds both on and off rails.

It is another object of this invention to provide a railcar moving vehicle that is economically constructed from a standard semi tractor.

The above and other objects are realized in a railcar moving vehicle having a load-shifting device for shifting a portion of the weight of a railcar to the railcar moving vehicle. The railcar moving vehicle has a frame, an engine, and at least one pair of drive wheels disposed toward the rearward portion of the frame and configured to ride on railroad track. The load-shifting device is connected to the vehicle frame rearward of the drive wheels, and includes a rearward facing coupler which is configured to transmit vertical and horizontal forces to a coupled railcar. The coupler is moveable by means of the load shifting device between a first lowered position for coupling with a standard railcar coupler, and a second position above and forward of the first position, thereby imposing a portion of the weight of the railcar upon the frame of the railcar moving vehicle, and moving the bearing point of said weight closer to above the drive wheels.

In one illustrative embodiment, the lifting means is hydraulically powered and moves the coupler from the first position to the second position in a substantially linear, diagonally upward motion at any desired angle, such as approximately 45°. The railcar moving vehicle is a modified semi tractor having a standard fifth wheel connector for connection to a standard highway trailer, and is provided with means for selectively installing rubber tired wheels to allow operation of the vehicle as a trailer moving vehicle on roadways.

Other objects and features of the present invention will be apparent to those skilled in the art, based on the following description, taken in combination with the accompanying drawings.

DETAILED DESCRIPTION OF THE PREFERRED EMBODIMENT

Figure 1:
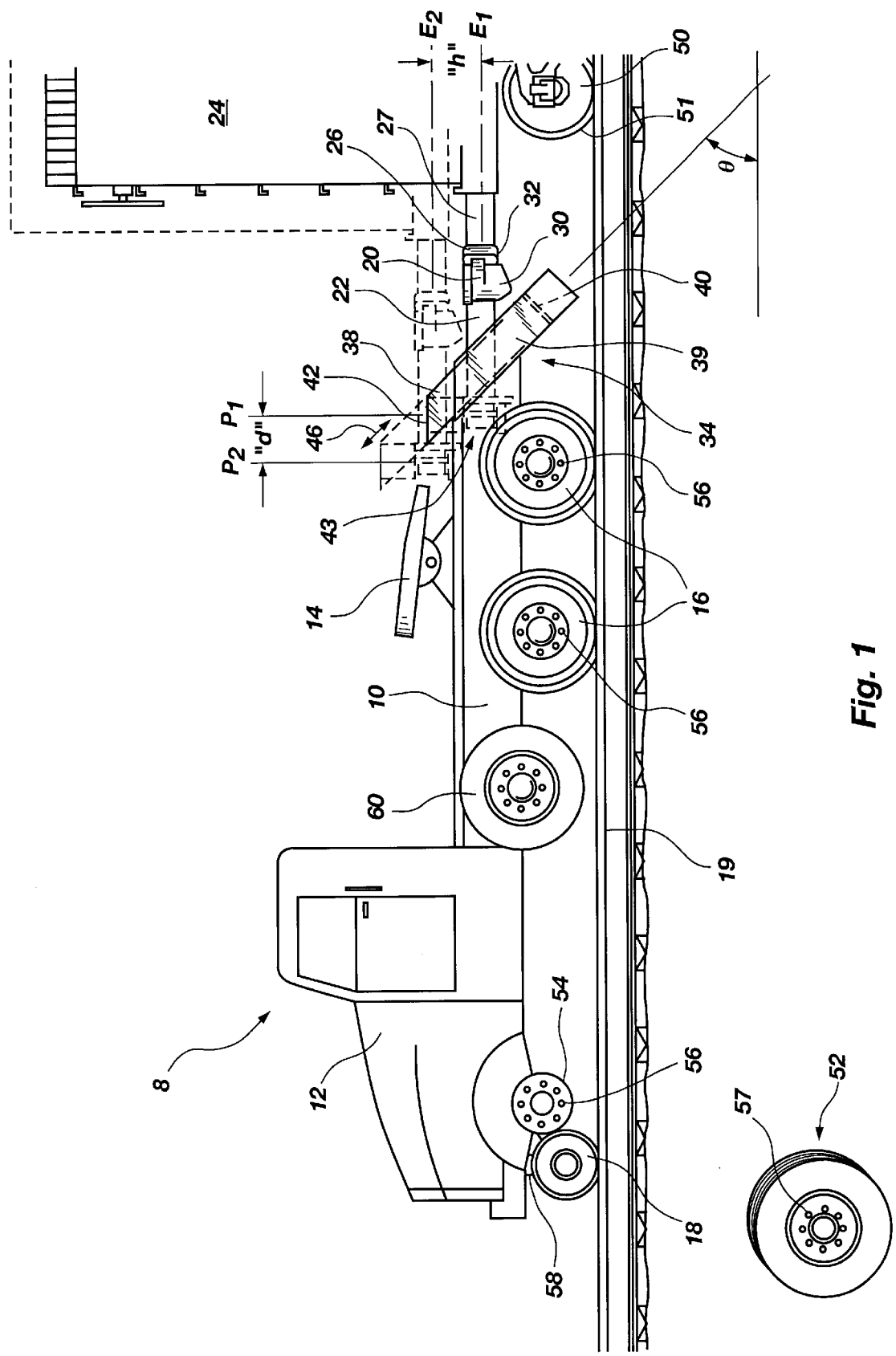
FIG. 1 is a side view of a semi tractor configured for use as a railcar moving vehicle and coupled to a railcar, and provided with a load-shifting device in accordance with the present invention.
Figure 2:
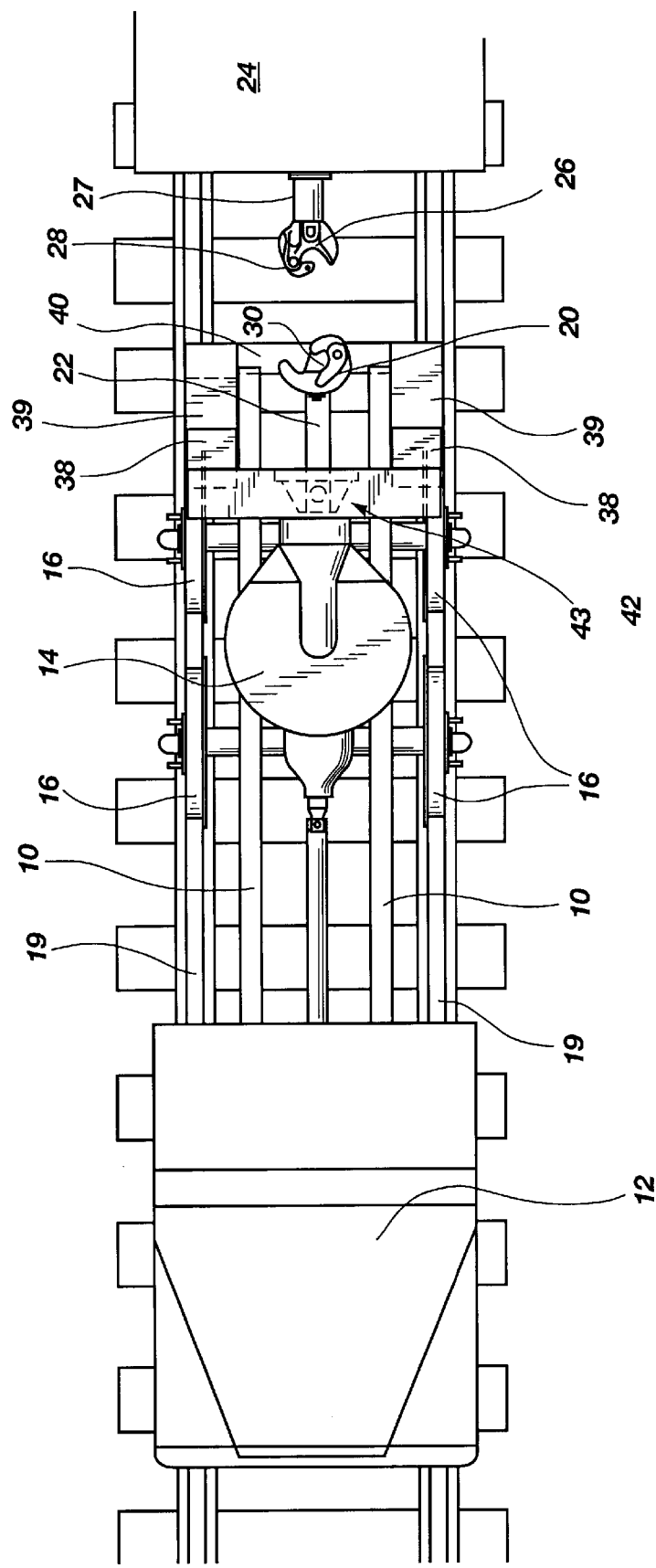
FIG. 2 shows a top view of the railcar moving vehicle including the load-shifting device according to the present invention.

Referring now to the drawings:

FIG. 1 is a side view of a semi tractor 8 configured for use as a railcar moving vehicle coupled to a railcar 24. It is to be understood that the opposite side of the truck is essentially a mirror image of the side shown, and that most components depicted in FIG. 1 have a mirror image counterpart on the opposite side of the vehicle. FIG. 2 is a top view of the same, but uncoupled from the railcar 24.

The tractor 8 is a conventional semi tractor in most respects, having an elongate frame 10, cab 12 housing the engine and controls, and standard fifth-wheel assembly 14 for pivotally connecting the tractor to a conventional highway trailer. However, to function as a railcar moving vehicle, the tractor 8 is provided with railroad wheels 16 and 18 for use on railroad tracks 19, instead of rubber tired wheels for roadway use. The drive wheels 16 are at the rear of the tractor, and typically smaller guide wheels 18 support the front of the vehicle. It will be apparent that the drive wheels 16 must be affixed to the drive axles of the tractor so as to propel the vehicle. As shown in FIG. 1, the vehicle 8 is also provided with unpowered rubber tired auxiliary wheels 60 which are common on large trucks, and which may be selectively raised and lowered by hydraulic or pneumatic means for contact with a roadway so as to spread the weight when the truck is carrying a particularly heavy load. It will be apparent that these auxiliary wheels will be retracted and not engaged when the vehicle is operating on railroad tracks.

When configured for use as a railcar moving vehicle, the rubber-tired wheels 52 used for highway operation are removed. It is clear from FIG. 1 that with the guide wheels 18 supporting the load of the tractor cab, the bare front wheel hub 54 of the tractor is suspended above the rails 19, with its lug bolts 56 exposed. The guide wheels 18 are preferably hydraulically retractable by a support mechanism 58 so that when the rubber tired tractor wheels 52 are installed and the tractor is operated on roadways, the railroad guide wheels 18 are not in the way. It will also be apparent that the guide wheels 18 could be hydraulically extendable so that removal of the rubber tired front tractor wheels is not necessary in order to configure the vehicle for use on the rails.

The railroad drive wheels 16 are configured somewhat differently than the guide wheels 18. Instead of a separate set of retractable wheels, the railroad drive wheels and roadway wheels utilize the same axles, and herein lies one of the advantageous features of the present invention. Because the rails of standard railroad track are closer together than the standard wheelbase width of highway trucks, the railroad drive wheels 16 may be affixed to the drive axles of the tractor in place of the usual inner dual wheel member of semi tractor wheels. The outer hub of the railroad drive wheels 16 is provided with lug bolts 56 so that a rubber tired truck wheel 52 may be affixed directly to the outside of each railroad drive wheel 16. Because with this configuration the vehicle will not have dual wheels as is normally the case with semi tractors, the auxiliary wheels 60 may be needed during normal highway operation, and oversized, higher load capacity rubber tired truck wheels 52 may also be provided to support the trailer load during highway operation. The rubber tired truck wheels 52 are naturally provided with a plurality of holes 57 for matching the lug bolts 56. It will be apparent that the railroad drive wheels 16 are smaller in diameter than the truck tires so as to prevent the railroad drive wheels from interfering with roadway operation. However, this configuration avoids the need to remove the railroad drive wheels 16 whenever it is desired to use the tractor 8 on roadways, rather than on rails.

Figure 3:
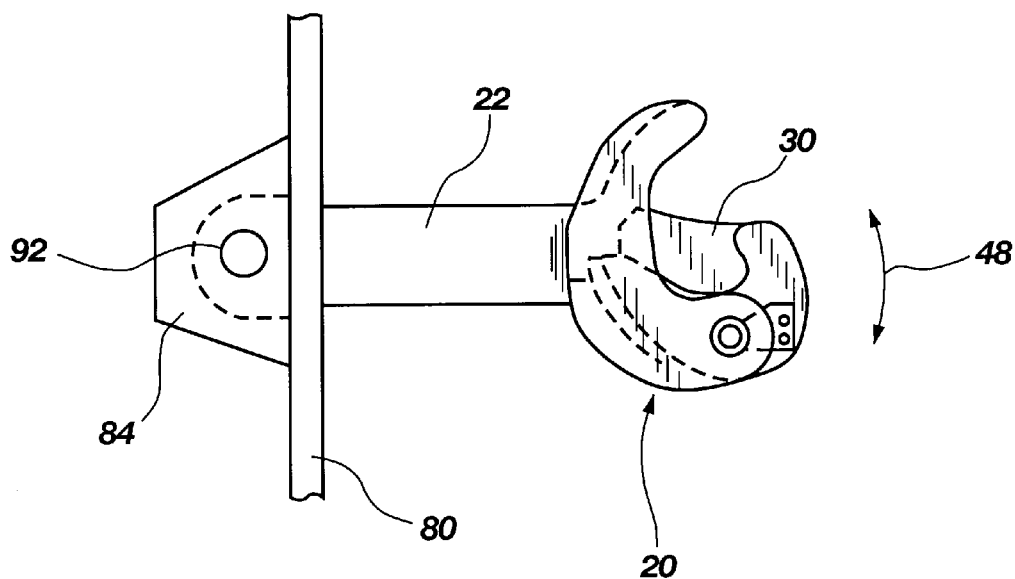
FIG. 3 shows a top view of the lifting coupler and drawbar of the load-shifting device of the present invention.

Attached to the rearward portion of the frame 10, immediately behind the fifth wheel assembly 14, is a coupler 20 and drawbar 22 for coupling to a typical railcar, such as a boxcar 24, as depicted in FIG. 1. This coupler allows the vehicle 8 to propel the railcar 24 along the railroad tracks 19. In accordance with the present invention, the coupler 20 is of the lifting type, being configured to lock with the knuckles 28 of a conventional coupler 26, shown on the boxcar 24. The lifting coupler 20 not only provides secure engagement of a standard coupler 26, to allow the vehicle 8 to push and pull the railcar 24 as with all conventional couplers, but also includes a lower support surface 30, shown more clearly in FIG. 3, which provides a top view of the present invention. The support surface 30 engages the bottom surface 32 of a standard coupler, and allows the lifting coupler to impart significant upward force on the coupler 26 and drawbar 27 of the railcar 24. The advantages of this configuration will be more completely apparent hereafter.

Figure 4:
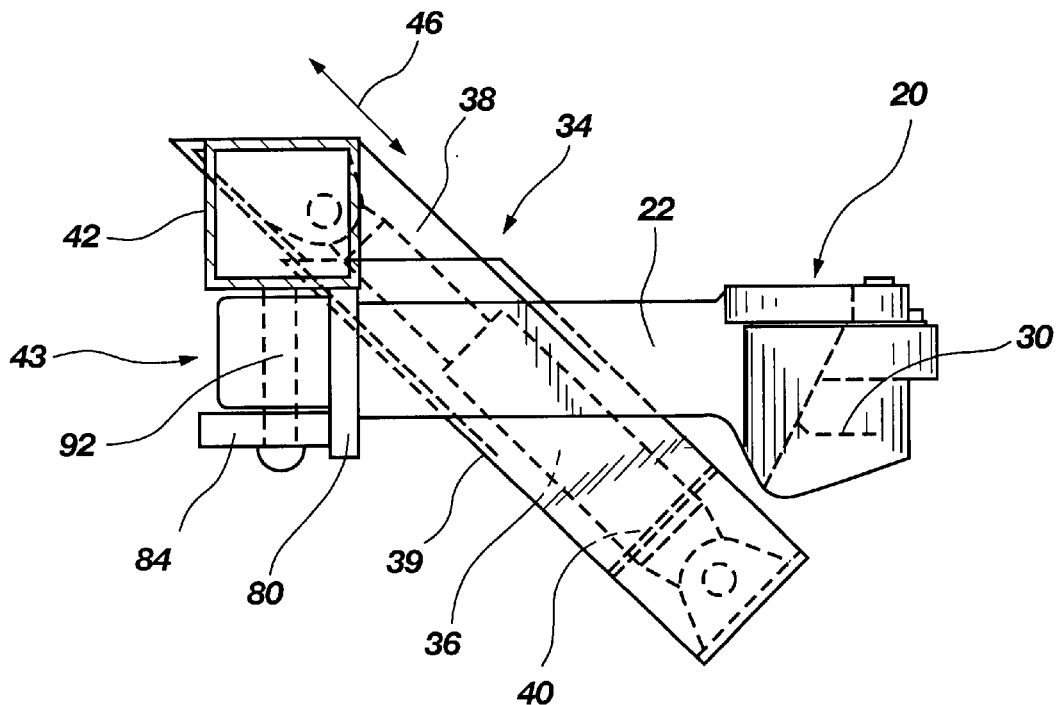
FIG. 4 shows a partial side sectional view of the lifting coupler and hydraulic lift assembly of the present invention.

The lifting coupler 20 and drawbar 22 are connected to the frame 10 by means of a lifting mechanism indicated generally at 34, and best viewed with reference to FIGS. 1, 2, and 4. FIG. 4 provides a partial side sectional view of the lifting coupler 20 and lift assembly 34 of the present invention. As shown in FIG. 4, the lifting mechanism 34 is comprised of one or more hydraulic cylinders 36 which are pin connected inside telescoping tubular steel members. The telescoping members generally comprise a base 39 which is fixedly attached to the rear extremity of the vehicle frame 10 on opposing sides thereof, and a smaller sized telescoping support arm 38 which is recessed into the tubular base member 39. The purpose of the telescoping members 38 and 39 is to provide rigid mechanical support for the imposed loads at various stages of extension in order to prevent damage to the seal of the hydraulic cylinders 36. The hydraulic cylinders 36 are pin connected within the telescoping members so that only axial loads are transmitted thereto. Those skilled in the art will understand that the imposition of significant bending moments upon typical hydraulic actuators will lead to their premature failure. It will also be apparent to one skilled in the art that the lifting mechanism 34 could be comprised of hydraulic cylinders 36 alone, without the use of telescoping members 38 and 39. However, some structure will generally be required to ensure that the forces on the hydraulic cylinders are not such as will impair its functioning.

The telescoping members 38 and 39 may be of various configurations, such as round or rectangular in cross section. In the appended figures they are shown as approximately square in cross-section. The lower ends of the base members 39 are braced with a cross brace 40, and the support arms 38 are rigidly connected together by a crossbar 42. Connected to the crossbar 42 approximately at its midpoint is the drawbar mounting assembly 43, shown more clearly in FIG. 3. As shown in the top view of FIG. 3, the drawbar mounting assembly 43 comprises a vertically oriented drawbar support plate 80, a horizontally oriented hinge support plate 84 affixed to the drawbar support plate 80, and a hinge pin 92, which rotatably fixes the end of the drawbar opposite the coupler so that the drawbar and coupler may freely pivot about the pin 92 as shown by arrow 48. It will be apparent that other configurations of the drawbar mounting assembly that are sufficient to withstand the loads imposed by lifting a loaded railcar may be advantageously employed in accordance with the present invention.

As shown in the top view of FIG. 2, the telescoping members 38 and 39 are oriented in line with frame 10 of the vehicle, but are oriented at some forward leaning angle θ with respect to the horizontal, as shown in FIG. 1. This angular orientation allows the lift assembly 34 to shift the weight of a coupled railcar 24 from a first position in which its weight is supported by its own trucks, shown in solid lines in FIG. 1, to a second position, shown in phantom line in FIG. 1, wherein the railcar has been lifted up and forward to add additional weight to the drive wheels 16 of the railcar moving vehicle 8. The angle θ may be any angle which both lifts the attached railcar and moves it forward so as to bear more directly on the drive wheels of the railcar moving vehicle. In the preferred embodiment, θ is approximately 45°, but it will be apparent that other angles may be used.

When the weight of an attached railcar is to be lifted and shifted forward over the drive wheels, a hydraulic actuator (not shown) increases the hydraulic pressure within the cylinders 36 causing the support arms 38 to extend axially from the base member 39, thereby lifting the crossbar 42 and the drawbar mounting assembly 43 diagonally up and forward in the direction of arrow 46. When moved in this way, the point at which the load of the railcar bears on the frame of the railcar moving vehicle moves horizontally from bearing point P1 some distance "d" to bearing point $P_2$. It will be apparent to those skilled in mechanical design that because point $P_2$ is closer to the nearest drive wheel than is point $P_1$, the imposed weight of the railcar will be more evenly distributed to both sets of drive wheels, and less uplifting moment will be created which tends to lift the front of the railcar moving vehicle. Additionally, the elevation of the railcar moves vertically from elevation $E_1$ some distance h to elevation $E_2$. It will be apparent that with the cylinders 36 oriented at a 45° angle, "d" and "h" will be equal.

The lifting mechanism 34 is preferably provided with a power down feature. When lowering the lifting assembly 34, the hydraulic actuator does not merely release pressure and allow gravity to force the mechanism down. Instead, the hydraulic actuator provides downward pressure in the cylinders 36, allowing the support arms 38 to move back to their first position under force. This feature provides many benefits. First, it allows the lift mechanism 34 to be used in combination with a support post or bar as a jack for removing or installing roadway tires on drive wheels of the railcar moving vehicle. It also allows the vehicle to lift itself back onto the rails in case of derailment.

When transferring the load of a railcar, the distance the railcar must be lifted, and hence the distance the support arms must advance, is dependent on the weight of the railcar and the amount of depression of the railcar support springs under the normal load of the car. Typical railcars employ springs to resiliently support the weight of the loaded car with a maximum travel of 6" to 8". Thus, to completely remove the load from the forward truck of a loaded railcar, a load-shifting device generally needs to provide a vertical lift of less than 6". However, the inventor has found that it is neither desirable nor necessary to completely unload the forward truck of the attached railcar, but merely to remove a portion of the load. Naturally, only as much load as is needed for traction should be transferred to the railcar moving vehicle. Furthermore, it is desirable for the railcar wheels 50 and flanges 51 to remain in firm contact with the rails so as to prevent derailment. The inventor has found that with a 45° cylinder angle, providing support arms 38 and hydraulic cylinders 36 with a total travel of approximately 20 inches is sufficient to shift the weight needed for traction. Those skilled in the art will understand that some semi tractors include compliant pneumatic suspension systems for their drive wheels, though many do not. It will be apparent that in the case of a vehicle having a pneumatic suspension, the suspension will be depressed some amount during the load shifting process. Consequently the lifting mechanism 34 must have sufficient travel to allow for this additional flexure. In the process of load shifting, the drawbars 22 and 27 also flex some amount, in addition to the extension of the railcar springs. The inventor has found that given all sources of flexure, the springs of the railcar typically only extend or unload by approximately 3", whether the railcar is loaded or unloaded, before the load transfer is sufficient.

As shown in FIG. 1, when in the lifted position, the frame of the railcar 24 will not be parallel to the railroad track, but will be disposed at some slight angle relative thereto as a result of the lifting. It will be apparent that when lifting the front end of the railcar, the trucks on the opposite end of the railcar will act as a fulcrum, with the frame of the railcar rotating thereabout as a lever. As a result, the railcar drawbar 27, which is designed to be essentially rigid in the vertical plane, will rotate with the frame of the railcar and assume the same angle relative to the tracks. While this rotation of the drawbar may be relatively slight because the length of typical railcars (50' to 80') is very large compared to the distance of vertical lift (≈3"), even slight rotation of one coupler relative to the other can induce substantial stresses in the joined couplers. Consequently, in one embodiment, the present invention is designed to allow slight concomitant rotation of the drawbar 22 of the railcar moving vehicle so as to allow continued axial alignment of the vehicle drawbar 22 and the railcar drawbar 27 to reduce these stresses. This rotational feature may be easily provided to the vehicle of the present invention by selecting structural steel members for the cross bar 42 and drawbar mounting assembly 43 that will provide appropriate flexure when under stresses at levels potentially excessive for the coupler 20 and drawbar 22. Conversely, there may be situations in which even slight rotation of the drawbar 22 is unwanted. For these situations, rotation may be prevented by selecting structural steel members for the cross bar 42 and drawbar mounting assembly 43 that will experience negligible flexure when under anticipated loads.

It will be apparent that the lift assembly 34 need not be hydraulic, but may be configured in any manner known in the art that will provide sufficient force to lift the front of a loaded railcar. For example, a pneumatic mechanism, or an electromechanical mechanism such as a screw jack could be advantageously employed. The hydraulic lift assembly shown herein is presently preferred as providing a quiet running yet fast operating system for shifting the railcar load. Furthermore, the hydraulic lift mechanism allows the operator to monitor the amount of load shifted simply by viewing the hydraulic pressure gage which is naturally a part of the system. An eletromechanical lifting mechanism, on the other hand, would require additional features to allow monitoring of the load.

Advantageously, the railcar moving vehicle described herein is very economical because it may be used both on and off of the rails. Also, because it is a modified semi tractor, rather than a limited production specialty vehicle, the economics of mass production help to keep the purchase price relatively low. Moreover, conventional railcar moving vehicles are typically only capable of speeds up to 15 or 20 miles per hour, and are equipped with a hydraulic transmission which overheats when operated at top speeds for any long period of time. The present invention, in contrast, uses a standard, proven engine and drive train which is routinely capable of extended operation at high speeds. Because conventional semi tractors are provided with anywhere from 8 to 18 different gears, they also have a wider range of running speeds and load pulling capacity.

With this vehicle, a work crew can transport themselves, their materials, and equipment by highway to a rail siding close to a site of needed maintenance. The crew then simply transfers their materials and equipment from the highway trailer to a railcar located at that siding, moves the semi tractor onto the rails, and couples it to the railcar to travel to the work site at mainline speed. Thus the same vehicle which transports them on the highway takes them to the work site with their materials and equipment. With this hybrid vehicle, maintenance of way crews can perform their work with far less labor and capital equipment expense, and less disruption of mainline rail traffic. This invention also provides railroad customers having a need to move railcars and highway trailers with a versatile vehicle for use on or off rails at an industrial site or rail siding, and allows transport of highway trailers on public highways as well.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A load-shifting device for shifting a portion of the weight of a railcar to a railcar moving vehicle having a frame, an engine, and at least one pair of drive wheels configured to ride on railroad tracks and powered by said engine, said frame having a rearward portion and said drive wheels being disposed toward the rearward portion of the frame, said load-shifting device comprising:

a rearward facing coupler for coupling to the end of a railcar, said coupler disposed rearward of the drive wheels and configured to transmit vertical and horizontal forces to a coupled railcar, and said coupler having a first position for coupling with a standard railcar coupler, and at least one second position above and substantially forward of said first position; and lifting means affixed to said coupler and connected to the rearward portion of the frame of the railcar moving vehicle, said lifting means configured to move the coupler from said first position to said at least one second position while coupled to a railcar, so as to lift the end of the railcar and thereby impose a portion of the weight of the railcar upon the frame of the railcar moving vehicle, and to move the bearing point of said weight closer to above said drive wheels.

2. The device as described in claim 1 wherein the lifting means is comprised of a mechanism selected from the group comprising hydraulically powered mechanisms, electromechanical devices, and pneumatic mechanisms.

3. The device as described in claim 2 wherein the lifting means moves said coupler from said first position to said at least one second position in a substantially linear, diagonally upward motion.

4. The device as described in claim 3 wherein the diagonally upward motion is at an angle of approximately 45°.

5. The device as described in claim 1 wherein the railcar moving vehicle is a modified semi tractor having a standard fifth wheel connector for connection to a standard highway trailer.

6. The device as described in claim 5 further comprising means for selectively installing rubber tired wheels to allow operation of the vehicle as a trailer moving vehicle on roadways.

7. A railcar moving vehicle comprising:

a modified semi tractor configured to ride on railroad track, said modified semi tractor having a frame, an engine, and at least one pair of drive wheels powered by said engine, said frame having a rearward portion and said drive wheels being disposed toward the rearward portion of said frame;

a hydraulic load-shifting device for shifting a portion of the weight of a railcar to the railcar moving vehicle, said load-shifting device comprising:

a rearward facing coupler for coupling to the end of a railcar, said coupler being disposed rearward of the drive wheels and configured to transmit vertical and horizontal forces to the coupled railcar, said coupler having a first position for coupling with a standard railcar coupler, and at least one second position above and substantially forward of said first position;

a drawbar rigidly connected at one end to said coupler and movably connected at the other end to the rearward portion of the frame of said railcar moving vehicle for transmitting the forces experienced by the coupler to the railcar moving vehicle; and hydraulic lifting means affixed to said drawbar and the rearward portion of the frame of the railcar moving vehicle, said lifting means configured to move the coupler from said first position to said at least one second position in a substantially linear, diagonally upward motion, while coupled to a railcar, so as to impose a portion of the weight of the railcar upon the frame of the railcar moving vehicle, and to move the bearing point of said weight closer to above said drive wheels.

8. The railcar moving vehicle as described in claim 7 further comprising a standard fifth wheel connector disposed on the rearward portion of the frame of said vehicle for connection to a standard highway trailer; and means for selectively installing rubber tired wheels to allow operation of the vehicle as a trailer moving vehicle on roadways.

9. The railcar moving vehicle as described in claim 8 wherein:

said at least one pair of drive wheels configured to ride on railroad track comprise steel railroad wheels, said drive wheels each being attached to said modified semi tractor in the position normally occupied by the interior wheel of a dual truck wheel set; and said means for selectively installing rubber tired wheels comprises means for selectively concentrically attaching rubber tired wheels to the exterior of said drive wheels, such that the rubber tired wheels occupy the position normally occupied by the exterior wheel of a dual truck wheel set, said rubber tired wheels having a diameter larger than the diameter of said drive wheels, such that operation of the railcar moving vehicle on highways does not require the removal of said railroad drive wheels.

10. The railcar moving vehicle as described in claim 8 wherein the lifting means is configured to move the drawbar from said first position to said at least one second position while coupled to a railcar without allowing any substantial rotation of the drawbar relative to the frame of the railcar moving vehicle.

11. The railcar moving vehicle as described in claim 8 wherein the lifting means is configured to move the drawbar from said first position to said at least one second position while allowing slight rotation of the drawbar relative to the frame of the railcar moving vehicle so as to maintain substantial alignment of the drawbar and coupler with respect to the railcar throughout the process of lifting the railcar.

12. The railcar moving vehicle as described in claim 8 wherein the diagonally upward motion is at an angle of approximately 45°.

13. A method of shifting a portion of the weight of a railcar to a railcar moving vehicle, said method comprising the steps of:

a) providing a railcar moving vehicle having a frame, an engine, a drawbar, a rearward facing coupler for coupling to the end of a railcar, hydraulic lifting means for moving said drawbar, and at least one pair of drive wheels configured to ride on railroad track and powered by said engine, said frame having a rearward portion and said drive wheels being disposed toward the rearward portion of the frame, said coupler being disposed rearward of the drive wheels and configured to transmit vertical and horizontal forces to a coupled railcar, and said drawbar being rigidly connected at one end to said coupler and movably connected at the other end to the rearward portion of the frame of said railcar moving vehicle for transmitting the forces experienced by the coupler to the railcar moving vehicle, said drawbar being movable by the lifting means from a first position for allowing coupling by the coupler to a standard railcar, to at least one second position above and substantially forward of said first position;

b) coupling the railcar moving vehicle to a railcar by means of said coupler; and c) lifting the coupler by the lifting means so as to move the coupler from said first position to said at least one second position while coupled to the railcar in a substantially linear, diagonally upward motion, so as to lift the end of the railcar and impose a portion of the weight of the railcar upon the frame of the railcar moving vehicle, and to move the bearing point of said weight closer to above said drive wheels.

14. The method described in claim 13 comprising the more specific step of moving the drawbar from said first position while allowing slight rotation of the drawbar relative to the frame of the railcar moving vehicle so as to maintain substantial alignment of the drawbar and coupler with respect to the railcar throughout the process of lifting the end of the railcar.

\* \* \* \* \*